July 16, 1940. M. L. McLAUGHLIN Re. 21,509

FACE LIFTER

Original Filed March 26, 1935

INVENTOR
MAY L. McLAUGHLIN
BY John J. Hanrahan
ATTORNEY

Reissued July 16, 1940

Re. 21,509

UNITED STATES PATENT OFFICE 21,509

FACE LIFTER

May L. McLaughlin, Fairfield, Conn.

Original No. 2,030,603, dated February 11, 1936, Serial No. 13,046, March 26, 1935. Application for reissue January 13, 1938, Serial No. 184,902

1 Claim. (Cl. 128—76)

My invention relates to facial device and refers more particularly to the applicator type of facial device for drawing and supporting the muscles of the face in place by forced movement of the facial tissues. The invention is particularly designed to raise the check tissues and maintain them in a taut position thus removing any wrinkles which may have been present.

An object of the invention is to provide a novel facial lifter for the elimination of facial wrinkles which is adapted to be locked to the hair adjacent the skin to be lifted, and more particularly to the hair adjacent the ears whereby the drawing or lifting action of the device will be applied to the cheeks and neck portion.

It is a further object of my invention to provide a device of the character indicated and which will be comfortable to the wearer even though worn for a long period of time and which may be completely concealed by the hair of the head without leaving undesirable traces of its presence.

An object of the invention is to provide a face lifting appliance by which a firm hold will be maintained on a flat tuft of hair at the top of the cheeks on both sides of the face and a continuous pull will be exerted upon such tufts of hair.

The device of the invention is simple in construction, easily attached, light and convenient to wear and readily applicable to heads of different sizes so that it can be used with a minimum of discomfort.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing—

Generally speaking the lifting device of the invention comprises a pair of hair clamps of light construction and particularly adapted for clamping and being locked to a small strand of hair adjacent to the upper portion of the cheek and ear. When the clamps are so attached they are connected by an elastic cord 10 carefully laid across the top of the head and under the hair whereby to be concealed. The ends of the elastic are drawn and tied together so as to provide sufficient tension to draw the skin up at each side of the face adjacent the ear but yet not with such tension as would cause discomfort to the wearer.

Figure 1:
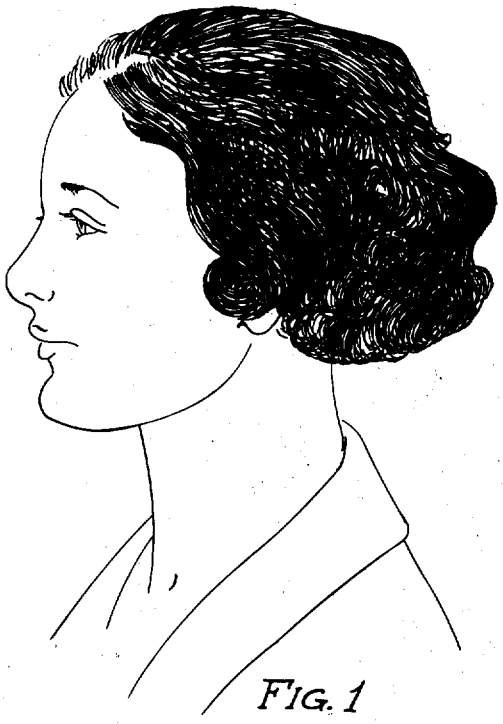
Fig. 1 is a profile view of the head and face of a woman wearing one of the lifting devices of the invention.
Figure 2:
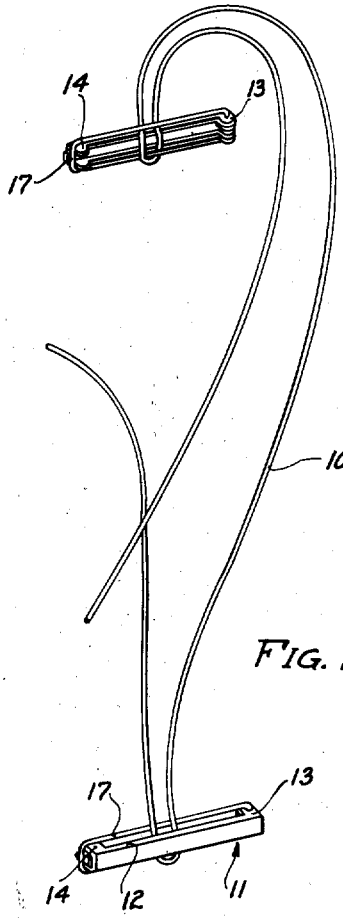
Fig. 2 is a perspective view of one of my improved lifting devices alone.
Figure 3:
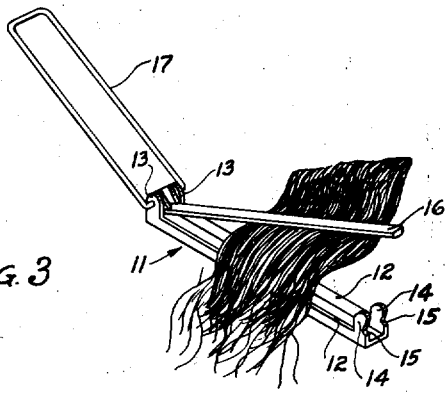
Fig. 3 is a perspective view of one of the two clamp members of the device.
Figure 4:
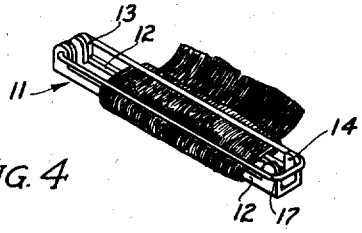
Fig. 4 is a perspective view of one of the hair clamp members in closed position as when attached to the hair of a wearer of the device.

These clamps of which there are two are clearly shown in Figs. 2, 3 and 4 and as will be seen comprise an elongated base member 11 having upwardly directed parallel side portions 12, the inner end portions of the edges of which are extended upward to form bearings 13 while the edges of the outer end portions of such portions 12 extend to provide ears 14 each having a notch 15 in its outer or forward edge. A tongue-like member forming a clamp 16 is hingedly connected to the bearings 13 and is adapted to be laid down in the trough of base 11 after a small bunch of hair has been disposed across the base.

After the hair is inserted as suggested the clamp is given a couple of turns so it is rolled slightly in the strand of hair whereupon the clamp and hair are secured or locked by a loop 17. Such loop is attached to the bearings 13 by reason of the ends of the wire of which the loop is formed extending through holes in such bearings. After the loop has been brought down upon the hair and clamp 16 it slides or is forced over the outer ends of the ears 14 and drops or snaps into the notches 15 whereby the assemblage is held together.

The elastic cord 10 connecting the two clamps can be best applied by first parting the hair across the head from one clamp to the other, then raising the cord and its knotted ends in the part and next brushing the front portion of the hair back over the cord to completely conceal it. The clamps are naturally applied in somewhat the same manner. The surplus portion of the hair is brushed up leaving only sufficient of the lower strands for engagement with the clamp which after being attached in the manner above indicated is covered by the upper portion of the hair which when formed into a loop or curl will admirably cover the clamps.

When the clamps are attached to the hair it is noted that portions of the hair are wrapped about the clamps and that the clamps and such portions of the hair are then locked together by the loops 17. Thus the clamps may not work up or down on the hair and in fact can have no movement relative to the hair. Therefore the device of the invention when properly applied will stay in place and perform its function until removed. There is no chance of its slipping one way or the other. In this connection it is noted that both clamps must hold in place as should one release tension will no longer be applied through either, they being connected by the cord 10.

Wrinkles in the forehead may obviously be drawn out by applying or attaching one of the clamps to the front hair just above the forehead and attaching the other clamp to the hair in the top or back of the head so that when the elastic is tightened and tied the skin on the forehead would be lifted and stretched whereby the wrinkles would be made to disappear.

Having thus set forth the nature of my invention, what I claim is:

A clamp for use in a facial lifting device comprising two hair attaching clamps, connected by an elastic cord, said clamp comprising an elongated trough-like base member having a pair of parallel up-turned, spaced apart ears on each end, the ears upon one end being provided with alined pintle holes while the ears upon the other end are provided with aligned notches on their outer edge, a clamping tongue hingedly connected to and between the pintle ends of the said member and shaped to fit into the said base and clamp the strands of hair of the head therein preparatory to winding, an elongated wire clamp having its ends journaled in the said holes forming a hinge connection to the base and adapted to be pressed down upon and clamp the wound hair and its free end to engage the notches in a way to hold the parts together.

MAY L. McLAUGHLIN.